March 25, 1924.
R. ADAMS
FLOUR SIFTER
Filed April 12, 1923
1,488,306
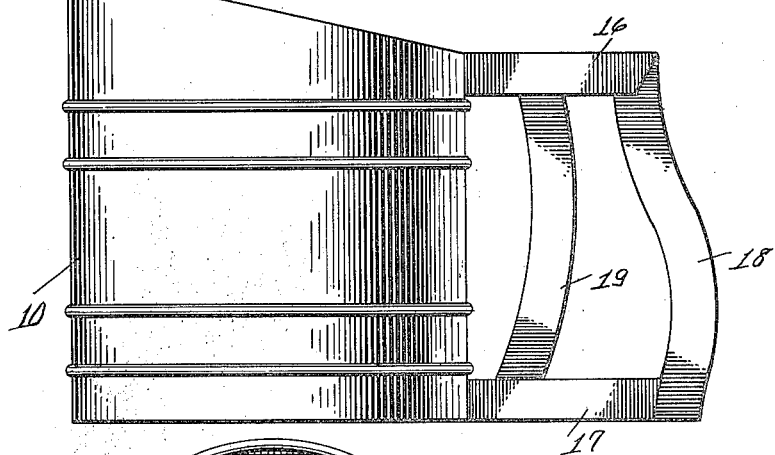
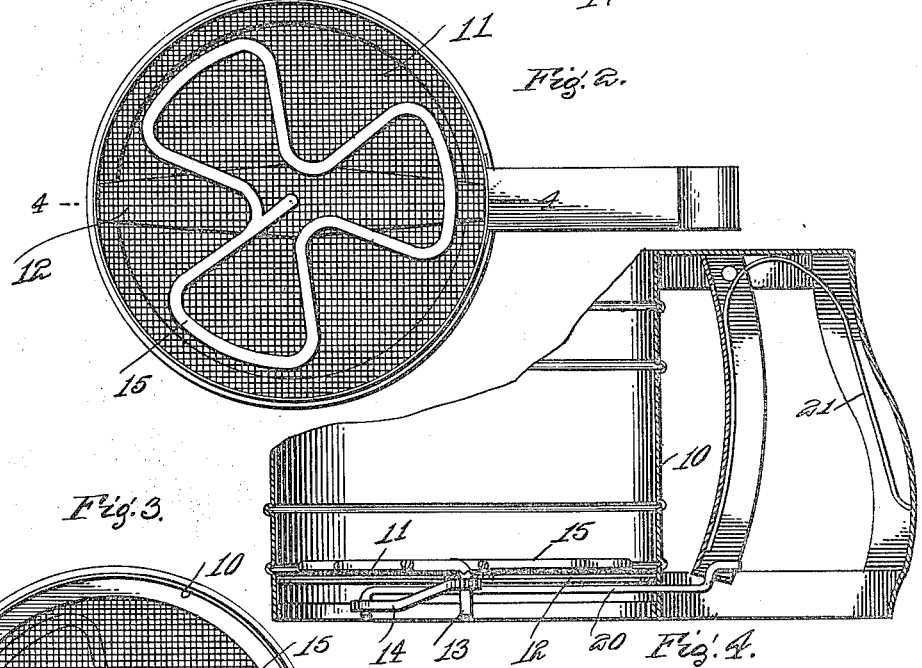
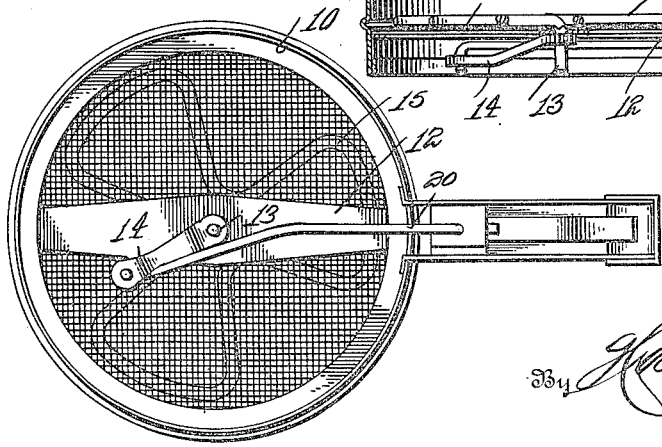
Inventor
Rose Adams.
By
Attorney Patented Mar. 25, 1924.

1,488,306

UNITED STATES PATENT OFFICE.

ROSE ADAMS, OF TACOMA, WASHINGTON, ASSIGNOR, BY MESNE ASSIGNMENTS, TO MEETS-A-NEED MANUFACTURING CO., A CORPORATION.

FLOUR SIFTER.

Application filed April 12, 1923. Serial No. 631,617.

*To all whom it may concern:*

Be it known that I, ROSE ADAMS, a citizen of the United States, residing at Tacoma, in the county of Pierce, State of Washington, have invented certain new and useful Improvements in Flour Sifters; and I do hereby declare the following to be a full, clear, and exact description of the invention, such as will enable others skilled in the art to which it appertains to make and use the same.

This invention relates to new and useful improvements in sifting devices and particularly to devices for sifting flour.

One object of the invention is to provide a device of this character which requires only one hand to hold the sifter and to operate the same, thus permitting the other hand to be used otherwise.

Another object is to provide a device of this character which is simple in construction, cheap to manufacture, and which is strong, durable, and effective in its operation.

Other objects and advantages will be apparent from the following description when taken in connection with the accompanying drawings.

In the drawings:

Figure 1 is a side elevation of a flour sifter made in accordance with the present invention.

Figure 2 is a top plan view of the device, showing the agitator.

Figure 3 is a bottom plan view showing the operating means for the agitator.

Figure 4 is an enlarged vertical sectional view taken centrally on the line 4—4 of Figure 2.

Referring particularly to the accompanying drawings, 10 represents a cylindrical casing having both ends open, as is usual in this class of devices, and having a screen disk 11 secured within the bottom open end. Also secured within this bottom end, and extending across the same, is a supporting bar 12, through the center of which is disposed a short vertical shaft 13. Fixed on the shaft 13, below the bar 12, is a radially extending crank arm 14, to which reference will be made later herein. The upper end of the shaft 13 forms an integral part of the agitator 15, which lies on the upper face of the screen disk 11. From one side of the casing 10 there extends the loop handle including the upper and lower horizontal members 16 and 17, and the vertical member 18, which connects the outer ends of the members 16 and 17. Pivotally suspended on the intermediate portion of the upper member 16 is a lever 19, the lower end of which is guided within the lower member 17, and pivotally connected to the lower end of the lever is a link 20 which extends beneath the bar 12 and is pivotally connected with the outer end of the crank arm 14. A bowed spring 21 is disposed between the outer side of the lever 19 and the inner face of the vertical member 18, of the handle, for normally and resiliently holding the lever forwardly toward the casing, and with the crank arm directed toward the diametrically opposite side of the casing 10.

The crank arm is slightly offset downwardly and then horizontally, so that the link 20 can be connected to the upper face of the crank arm. Furthermore, the lower end of the shaft 13 projects slightly below the lower face of the bar 12, whereby when the spring 21 forces the lever forwardly the lever will strike against the crank arm and the projecting end of the shaft, thus preventing the crank arm and link arriving at a dead center.

In the operation of the device the handle is grasped in the hand of the operator, with the fingers between the lever and the wall of the casing. Then, by pulling backwardly on the lever, the agitator will be rotated, and upon releasing the lever, the spring will restore the lever to its original position, with the result that the agitator will be given a partial rotation in each direction, and by so doing scrape on the upper face of the screen to separate the lumps and foreign matter from the flour and cause the finest thereof to pass through the meshes of the screen. It only requires the use of one hand, as the lever serves as a part of the grip, in conjunction with the member 18, so that the agitator can be turned back and forth as long as desired.

What is claimed is:

A flour sifter including a body having a reticulated bottom and a rotary agitator operable on the latter, an operating link connected with the agitator, a handle carried by the body and including outwardly extending parallel channel members, a vertical channel member secured to and extending between the outer ends of the channel members, the said vertical member inclining curvingly downwardly and outwardly, a a channel lever pivotally suspended within the channel of the upper parallel member and having its lower end movable in the channel of the lower parallel member, said lower end being connected with the before-mentioned link, and a bowed spring disposed between the vertical channel member and the channel lever and having its arms disposed within the said members respectively.

In testimony whereof, I affix my signature, in the presence of two witnesses.

ROSE ADAMS.

Witnesses:
 CHARLES W. JOHNSON,
 GLEN H. HIPPLE.